US012256185B2

(12) United States Patent
Oommen et al.

(10) Patent No.: US 12,256,185 B2
(45) Date of Patent: Mar. 18, 2025

(54) IN-EAR WEARABLE AUDIO DEVICES WITH FUNCTIONAL GRADING AND/OR EMBEDDED ELECTRONICS

(71) Applicant: Bose Corporation, Framingham, MA (US)

(72) Inventors: Binu K. Oommen, Franklin, MA (US); Kai Gao, Natick, MA (US); Mark Richard Bergeron, Grafton, MA (US); Shawn Prevoir, Northborough, MA (US); Raymond O. England, East Greenwich, RI (US)

(73) Assignee: Bose Corporation, Framingham, MA (US)

( * ) Notice: Subject to any disclaimer, the term of this patent is extended or adjusted under 35 U.S.C. 154(b) by 0 days.

(21) Appl. No.: 18/385,074

(22) Filed: Oct. 30, 2023

(65) Prior Publication Data

US 2024/0064451 A1 Feb. 22, 2024

Related U.S. Application Data

(62) Division of application No. 17/007,112, filed on Aug. 31, 2020, now Pat. No. 11,924,601.

(51) Int. Cl.
*H04R 1/10* (2006.01)

(52) U.S. Cl.
CPC .................................. *H04R 1/1016* (2013.01)

(58) Field of Classification Search
CPC .................................................... H04R 1/1016
USPC .......................................................... 381/174
See application file for complete search history.

(56) References Cited

U.S. PATENT DOCUMENTS

| | | | | |
|---|---|---|---|---|
| 2019/0052951 A1* | 2/2019 | Kofman | H04R 1/1041 |
| 2019/0231197 A1* | 8/2019 | Kirszenblat | H04R 1/1083 |
| 2020/0107098 A1* | 4/2020 | DiFonzo | H01F 1/147 |
| 2020/0107110 A1* | 4/2020 | Ji | A45C 13/005 |
| 2020/0129102 A1 | 4/2020 | Singh et al. | |
| 2021/0069490 A1* | 3/2021 | Hanson | H04R 1/1058 |

* cited by examiner

*Primary Examiner* — Sean H Nguyen
(74) *Attorney, Agent, or Firm* — Hoffman Warnick LLC

(57) ABSTRACT

Various implementations include in-ear wearable audio devices. In certain implementations, the in-ear audio devices include an eartip with a body having first and second ends, an inner wall extending between the first and second ends defining a hollow passage to conduct acoustic energy, and a deformable outer wall connected to the inner wall of the body at the first end and tapering away from the inner wall toward the second end, where the deformable outer wall is functionally graded from the first end to the second end to comply with an entrance of an ear canal of a user. In additional implementations, the eartip includes a retaining structure, and at least one of the inner wall or the outer wall of the body, or the retaining structure, has an integral electronic component and/or an electronic component signal trace.

18 Claims, 5 Drawing Sheets

IN-EAR WEARABLE AUDIO DEVICES WITH FUNCTIONAL GRADING AND/OR EMBEDDED ELECTRONICS

PRIORITY CLAIM

This application is a divisional filing of, and claims priority to, U.S. patent application Ser. No. 17/007,112 (filed Aug. 31, 2020), the entire contents of which are incorporated by reference herein.

TECHNICAL FIELD

This disclosure generally relates to audio devices. More particularly, the disclosure relates to an earpiece tip and related wearable audio device formed by additive manufacturing.

BACKGROUND

Many wearable audio device users desire ever-smaller components. As these devices shrink in size, it becomes challenging to integrate various device functions in a smaller footprint.

SUMMARY

All examples and features mentioned below can be combined in any technically possible way.

Various implementations include in-ear wearable audio devices with an outer wall that is functionally graded to comply with an entrance of an ear canal of a user. Other implementations include in-ear wearable audio devices with an integral electronic component and/or an electronic component signal trace in an inner and/or outer wall of the eartip body or in the retaining structure for the eartip.

In some particular implementations, an in-ear wearable audio device includes: an eartip having: a body having first and second ends, an inner wall extending between the first and second ends defining a hollow passage to conduct acoustic energy, and a deformable outer wall connected to the inner wall of the body at the first end and tapering away from the inner wall toward the second end, where the deformable outer wall is functionally graded from the first end to the second end to comply with an entrance of an ear canal of a user.

In other particular implementations, an in-ear wearable audio device includes: an eartip having: a body having first and second ends, an inner wall extending between the first and second ends to define a hollow passage to conduct acoustic energy, and a deformable outer wall connected to the inner wall of the body at the first end and tapering away from the inner wall toward the second end; a retaining structure coupled with the body; and at least one of an electronic component or an electronic component signal trace integrated in at least one of: the inner wall of the body, the outer wall of the body, or the retaining structure.

In additional particular implementations, a wearable audio device includes: at least one electro-acoustic transducer for providing an audio output; a controller for controlling the audio output at the at least one electro-acoustic transducer; and a casing containing the controller and the at least one electro-acoustic transducer, where the casing includes an outermost layer of the wearable audio device, and contains an electronic component or an electronic component signal trace integrated in the outermost layer.

Implementations may include one of the following features, or any combination thereof.

In particular cases, the functionally graded deformable outer wall has at least two distinct material types disposed in layers.

In certain aspects, the distinct material types include at least two of: silicone, polyurethane, polynorbornene, thermoplastic elastomer (TPE), polyvinylidene fluoride (PVDF) or fluoroelastomer.

In some implementations, at least two of the distinct material types have distinct durometers, causing a section proximate the first end to be softer than a section proximate the second end.

In particular aspects, at least one of the layers has a distinct thickness than another one of the layers.

In certain cases, each of the layers of the distinct material types has a thickness equal to or less than approximately 0.5 millimeters (mm).

In some aspects, the inner wall includes at least two distinct material types.

In particular cases, the eartip is formed by additive manufacturing.

In certain implementations, the in-ear wearable audio device further comprises: an electronics module coupled with the eartip, where the deformable outer wall forms a generally frustoconical shape around the inner wall.

In some aspects, the at least one electronic component or electronic component signal trace is embedded within at least one of the walls such that an outermost surface of the at least one electronic component or electronic component signal trace is inboard of an outermost surface of the at least one wall in which it is integrated.

In particular implementations, the at least one electronic component or electronic component signal trace is integrally formed within at least one of the walls by additive manufacturing.

In certain cases, the body includes at least one of: silicone, polyurethane, polynorbornene, thermoplastic elastomer (TPE), polyvinylidene fluoride (PVDF) or fluoroelastomer, and the at least one electronic component or electronic component signal trace includes a conductive element including at least one of: a biometric sensor, a capacitive sensor, a piezoelectric sensor, a circuit board, a metal pad, a metal button, a metal foil, a conductive elastomer or a conductive ink.

In some implementations, the at least one electronic component or electronic component signal trace is part of a sensor system configured to: detect a jaw movement of a user, detect a pulse of the user, detect electrical activity in the brain of the user, detect a body temperature of the user, detect a respiration indicator of the user, provide a guided meditation stimulation to the user or provide an electrode-based stimulation to the user.

In certain aspects, the at least one electronic component or electronic component signal trace comprises a material including at least one of: aluminum, a conductive elastomer, graphene, graphene nanotubes, structured carbon black, carbon nanofibers, silver-coated elastic, metallic shavings, a metal-salt hybrid, conductive ink, a polymeric composite, an intrinsically conductive polymer (ICP), or a conductive fabric.

In particular cases, the at least one electronic component or electronic component signal trace is integrated in the outer wall.

In some implementations, the outer wall is configured to contact the skin of a user.

In certain aspects, the in-ear wearable audio device further includes: a controller coupled with the at least one electronic component or electronic component signal trace, where the at least one electronic component or electronic component signal trace comprises a polyvinylidene fluoride (PVDF) film that is configured to detect movement in the skin of a user, and where the controller is configured to initiate a control function based on the detected movement in the skin of the user.

In particular implementations, the deformable outer wall is functionally graded from the first end to the second end to comply with an entrance of an ear canal of a user, where the functionally graded deformable outer wall includes at least two distinct material types disposed in layers.

In certain aspects, the in-ear wearable audio device further includes: an electronics module coupled with the eartip, where the electronic component is integrated in the outer wall or the inner wall and is configured to perform functions of the electronics module such that the electronics module is reduced in size relative to a reference electronics module in a reference in-ear wearable audio device without the electronic component integrated in the outer wall or the inner wall.

In some aspects, the in-ear wearable audio device further includes: an electronic component integrated in the deformable outer wall of the body or the inner wall of the body.

In some aspects, the in-ear wearable audio device further includes: a retaining structure coupled with the body.

In some aspects, the in-ear wearable audio device further includes: at least one of an electronic component or an electronic component signal trace integrated in the retaining structure.

In some aspects, the in-ear wearable audio device further includes: at least one of an electronic component or an electronic component signal trace integrated in the deformable outer wall of the body.

In some aspects, the in-ear wearable audio device further includes: at least one of an electronic component or an electronic component signal trace integrated in the inner wall of the body.

In some aspects, the inner wall of the body is functionally graded to have a greater stiffness proximate the first end of the body.

Two or more features described in this disclosure, including those described in this summary section, may be combined to form implementations not specifically described herein.

The details of one or more implementations are set forth in the accompanying drawings and the description below. Other features, objects and advantages will be apparent from the description and drawings, and from the claims.

Figure 1:
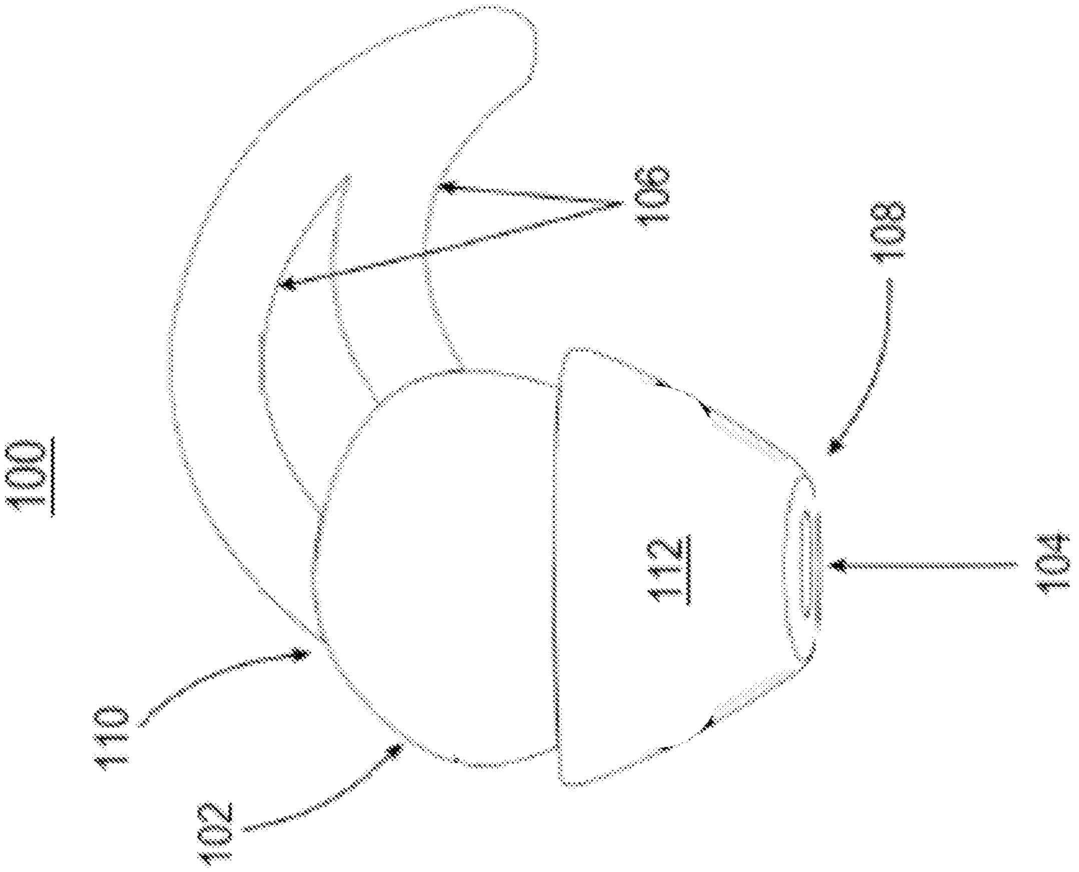
FIG. 1 shows a simplified perspective view of an earpiece according to various implementations.

It is noted that the drawings of the various implementations are not necessarily to scale. The drawings are intended to depict only typical aspects of the disclosure, and therefore should not be considered as limiting the scope of the implementations. In the drawings, like numbering represents like elements between the drawings.

DETAILED DESCRIPTION

This disclosure is based, at least in part, on the realization that an in-ear wearable audio device can benefit from an eartip with functional grading and/or embedded electronics. In various implementations, the wearable audio device is formed by additive manufacturing, which can enable the functional grading and/or embedding of electronics.

Commonly labeled components in the FIGURES are considered to be substantially equivalent components for the purposes of illustration, and redundant discussion of those components is omitted for clarity.

The examples and implementations disclosed or otherwise envisioned herein can be utilized with any suitable earpiece. Examples of suitable earpieces include Bose® Sleepbuds™ (manufactured by Bose Corporation of Framingham, Massachusetts), ear tips, earbuds, in-ear headphones, over-the-ear headphones, noise-blocking earplugs, and hearing aids. However, the disclosure is not limited to these devices, and thus the disclosure and embodiments disclosed herein can encompass any earpiece configured to be placed at least partially within human ears. Additional aspects of earpieces and related audio devices that can be configured to utilize the implementations herein are described in U.S. Pat. No. 10,667,030, as well as U.S. Pat. No. 8,737,669, both of which are entirely incorporated here by reference. Additionally, aspects of integrating electronics in an earpiece such as the earpieces according to various implementations are described in U.S. patent application Ser. No. 16/176,859 (Wearable Devices with Integrated Circuitry, filed on Oct. 31, 2018), which is incorporated here by reference.

Figure 2:
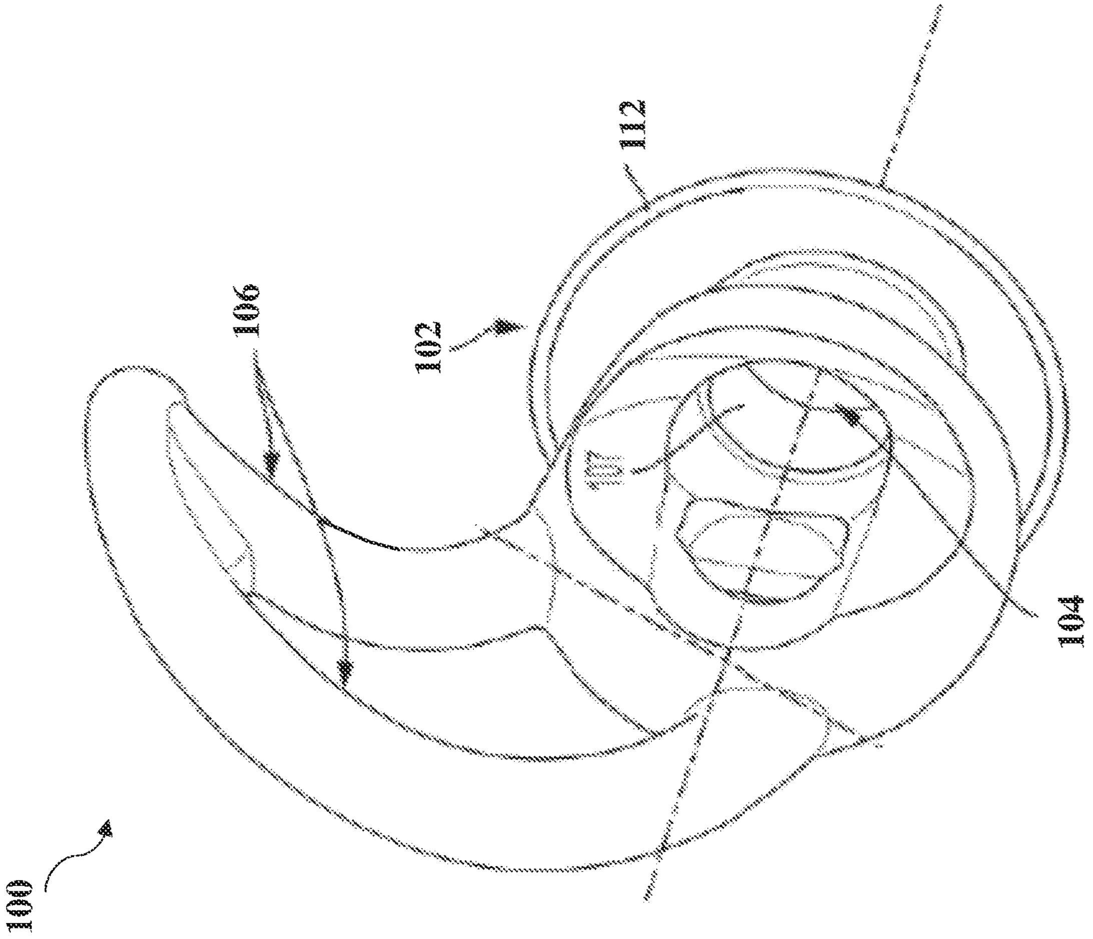
FIG. 2 shows another perspective view of an earpiece according to various implementations.

Turning now to the figures, FIG. 1 shows an example earpiece 100 including an ear tip that is configured to fit at least partially into a person's ear canal and a retaining structure configured to hold the ear tip in place when worn. FIG. 2 is a partial cross-sectional view of earpiece 100. The following should be viewed in light of FIGS. 1-2. The earpiece 100 may be part of a set of earphones (e.g., two earpieces) in a wearable in-ear audio device (not shown). Earpiece 100 can include body 102, and hollow passage 104, and a retaining structure (e.g., retaining legs) 106. In some instances, the body 102 is referred to as a casing, e.g., containing components such as electro-acoustic transducer(s) and controller(s). In other cases, the body 102 is configured to be removable from a base (core) of an earphone, where the base includes transducer(s), controller(s), etc. In particular implementations, the body (or, casing) 102 includes the outermost layer of the earpiece 100, at least a portion of which is configured to contact the skin of a user. Although FIGS. 1-2 show retaining legs 106 as one embodiment of a retaining structure, this disclosure is not limited to such a configuration. Any type of retaining structure is contemplated. Alternatively, the retaining structure 106 can be omitted altogether. That is, the retaining structure (including retaining legs) 106 is optional.

It may be desirable to place the earpiece 100 in the ear so that it is oriented properly, so that it is stable (that is, stays in the ear), so that it is comfortable, and, for some applications so that it provides significant passive attenuation of ambient noise. One way of providing stability and proper orientation is described above and is described more completely in U.S. Pat. No. 8,249,287, incorporated here by reference in its entirety. One apparatus for providing significant passive attenuation is a structure (for example a "Christmas tree" structure, as described in U.S. Pat. App. No. 2004/0163653, a "mushroom" structure, as described by U.S. Pat. No. 5,957,136, or disk shaped flanges, such as described in U.S. Pat. No. 6,129,175, or similar structures) that fits in the main portion of the ear canal and seals to the ear canal itself by exerting radial pressure on the walls of the main portion of the ear canal. Additional variations on the structure of the earpiece 100 are also possible.

Returning to FIGS. 1 and 2, the body 102 includes a first end 108 and a second end 110 opposite the first end 108. Second end 110 is proximate to the retaining structure 106. Body 104 further includes an inner wall 107 extending between the first end 108 and the second end 110. Inner wall 107 defines and surrounds hollow passage 104 which can be configured to conduct sound waves. Body 102 also includes an outer wall 112 connected to the inner wall 107 at the first end 108. Outer wall 112 tapers away from the inner wall 107 toward the second end 110. In example aspects, outer wall 112 is frustoconical in shape, and is deformable. As shown in FIGS. 1-2, the outer wall 112 tapers toward the second end 110 but does not necessarily reach the second end 110. In alternate embodiments not shown, outer wall 112 could extend to the second end 110 or beyond second end 110. Body 102 can be made of any suitable soft, flexible materials, including, for example, silicone, polyurethane, polynorbornene (e.g., Norsorex® material available from D-NOV GmbH of Vienna, Austria), thermoplastic elastomer (TPE), and/or fluoroelastomer.

Figure 3:
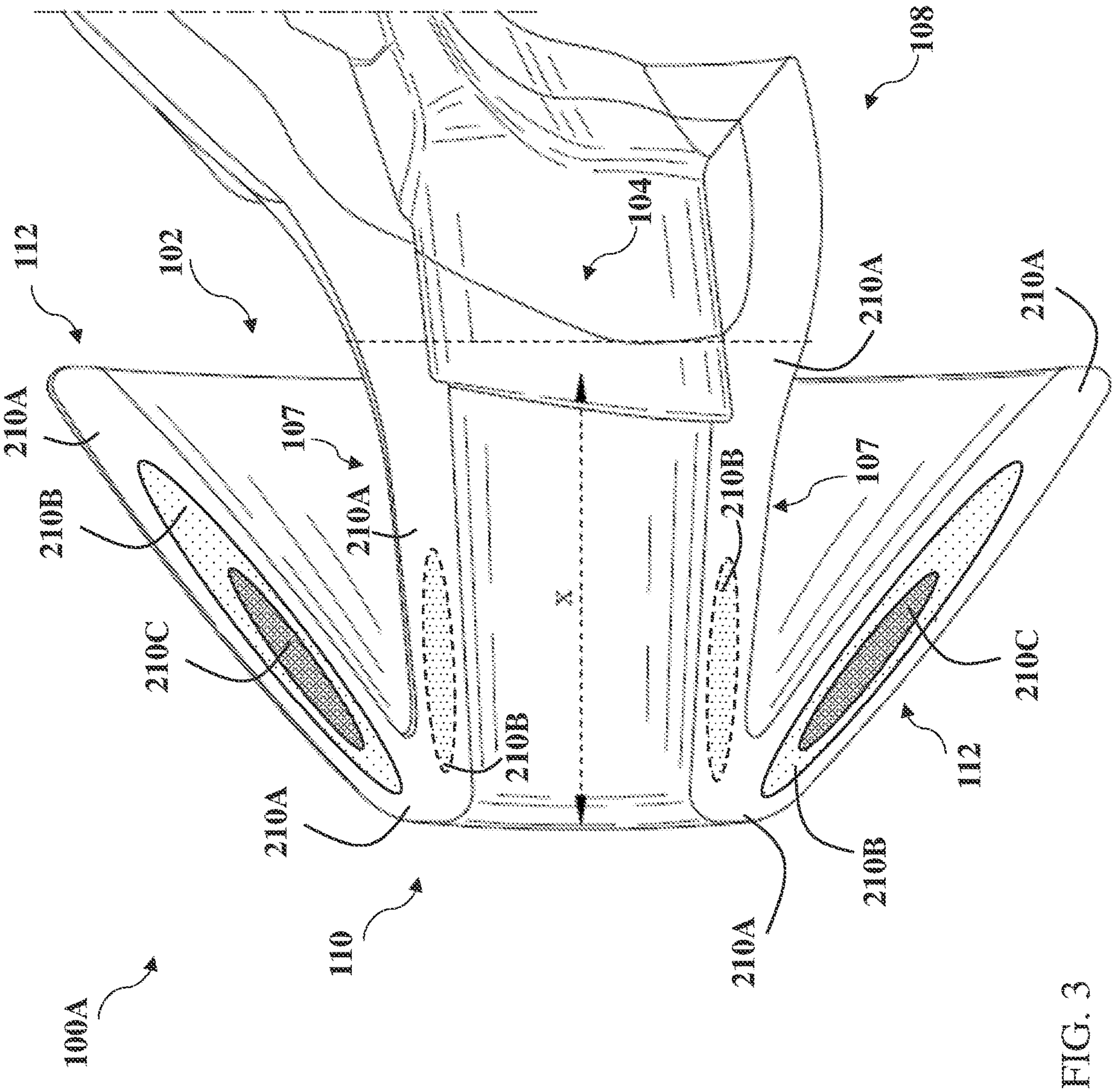
FIG. 3 is partial cross-sectional view of an earpiece according to additional implementations.

FIG. 3 shows a cross-sectional view of an earpiece 100A including an eartip according to various implementations. It is understood that earpiece 100A can include features similar to the earpiece 100 shown and described with reference to FIGS. 1 and 2, and in some cases, includes one or more functionally graded sections. As illustrated by the examples herein, functional grading includes the gradual variation in composition and structure of a component over its volume.

Figure 4:
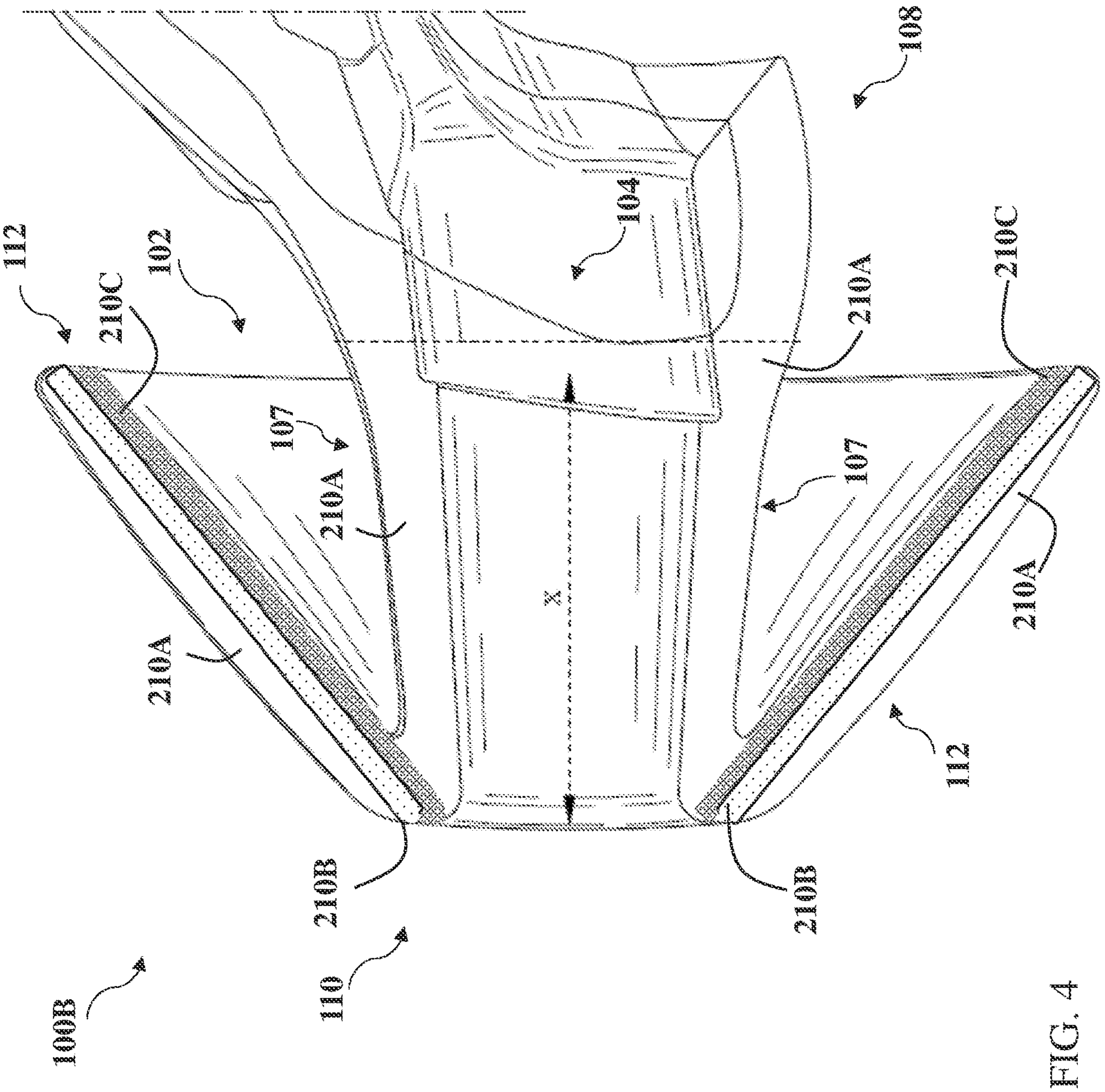
FIG. 4 is a partial cross-sectional view of an earpiece according to further implementations.

As shown in the example depiction in FIG. 3, the deformable outer wall 112 of the earpiece 100A is functionally graded from the first end 108 to the second end 110 to comply with an entrance of an ear canal of a user. That is, the deformable outer wall 112 is configured to deform in order to comply with the user's ear canal entrance. The functional grading along the dimension from the first end 108 to the second end 110 (e.g., at least partially along dimension x in FIG. 3) further enables the earpiece 100A to comply with a user's ear canal entrance, e.g., improving the fit of the earpiece 100A in the user's ear. In particular cases, the functionally graded outer wall 112 includes at least two distinct material types 210A, 210B, 210C, etc. that are disposed in layers. At least two distinct material types 210A, 210B are shown in FIG. 3. In some cases, the distinct materials include two or more of: silicone, polyurethane, polynorbornene, thermoplastic elastomer (TPE), polyvinylidene fluoride (PVDF) or fluoroelastomer. In certain implementations, the distinct material types 210A, 210B, etc. have distinct durometers, causing a section proximate the first end 108 to be softer than a section proximate the second end 110. In some example implementations, the eartip 100A has at least three distinct stiffnesses from the first end 108 to the second end 110. According to some embodiments, a greater percentage of the eartip 100A proximate the first end 108 is composed of a material type (e.g., material type 210A, 210B, 210C) that has a greater stiffness than the area of the eartip 100A proximate the second end 110. In additional cases, the eartip 100A is graded such that the first end 108 is formed only of a higher stiffness material type, while the second end 110 is formed of multiple material types having distinct stiffness. In additional implementations, at least one of the layers of material (e.g., 210A) has a distinct thickness than another one of the layers of material (e.g., 210B), either entirely along its span between the first end 108 and the second end 110, or along one or more portions of the span between the first end 108 and the second end 110. In some example implementations, each of the layers of material 210A, 210B, etc. has a thickness that is equal to or less than approximately 0.5 millimeters (mm). FIG. 4 illustrates an additional example of an eartip 100B in an in-ear wearable audio device, which can include one or more common features as eartip 100A shown and described with reference to FIGS. 1 and 2. In this example, each layer of material 210A, 210B, 210C has a thickness that is equal to or less than approximately 0.5 mm.

According to particular implementations, the inner wall 107 of one or more eartips (e.g., eartip 100A, eartip 100B, etc.) also includes at least two distinct material types, e.g., layers of materials 210A, 210B, etc. Eartip 100A in FIG. 3 illustrates an optional implementation where inner wall 107 includes two distinct material types, however, any implementation described herein can include an inner wall 107 with multiple material types. In the example of FIG. 3, the inner wall 107 can be functionally graded to have a greater stiffness proximate the first end 108 of the body 102.

Figure 5:
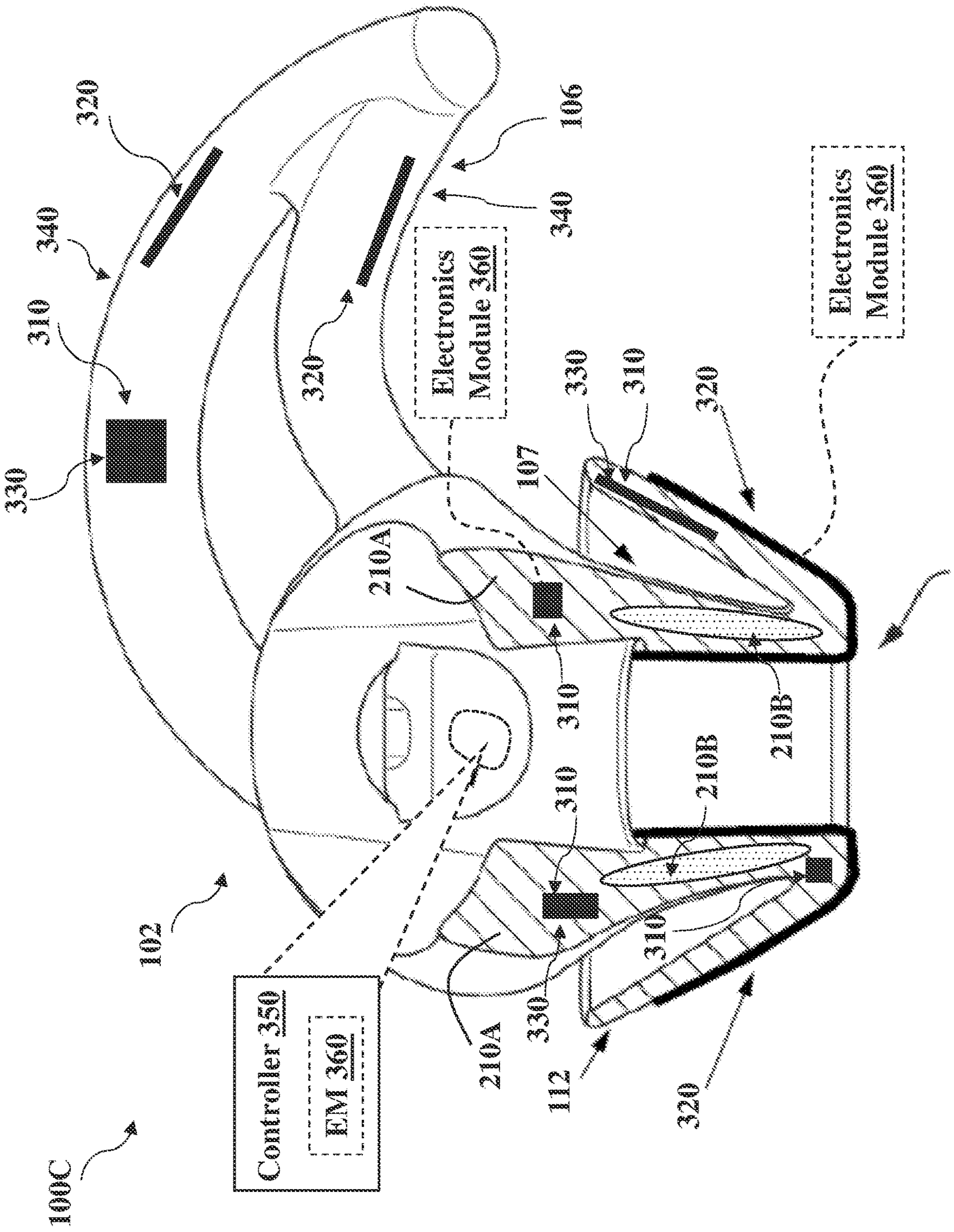
FIG. 5 is a partial cross-sectional view of an earpiece according to additional implementations.

FIG. 5 depicts an additional example of an eartip 100C in an in-ear wearable audio device, which can include one or more common features as the eartip 100A and eartip 100B shown and described with reference to FIGS. 1-3. As shown, eartip 100C can include at least one electronic component 310 and/or at least one electronic component signal trace (signal trace) 320 located in the inner wall 107, the outer wall 112 and/or the retaining structure 106. Examples are shown in various locations for illustrative purposes. In certain implementations, as noted herein, the electronic component(s) 310 and/or signal trace(s) 320 are integrally formed within wall(s) 107 and/or 112 via additive manufacturing. In these cases, the electronic component 310 and/or signal trace 320 is formed contemporaneously with the remainder of the eartip 100B, via additive manufacturing.

For example, in one implementation, the electronic component 310 and/or signal trace 320 is embedded within at least one of the walls 107, 112. In certain aspects, the electronic component 310 and/or signal trace 320 is embedded within the inner wall 107 and/or the outer wall 112 such that an outermost surface 330 of that electronic component 310 and/or signal trace 320 is inboard of an outermost surface 340 of the wall in which it is integrated. According to some example implementations, the electronic component 310 and/or signal trace 320 is integrated in the outer wall 112, e.g., a wall that is configured to contact the skin of a user. In these examples, the electronic component 310 and/or signal trace 320 can form part of a sensor or an actuator, e.g., for detecting a characteristic of the user from contact with the skin (sensor), or for stimulating the user via the skin (actuator).

In certain cases, as described herein, the body 102 of eartip 100C can include one or more materials such as: silicone, polyurethane, polynorbornene, thermoplastic elastomer (TPE), polyvinylidene fluoride (PVDF) or fluoroelastomer. The electronic component 310 and/or signal trace 320 can include a conductive element including at least one of: a biometric sensor, a capacitive sensor, a piezoelectric sensor, a circuit board, a metal pad, a metal button, a metal foil, a conductive elastomer or a conductive ink. In some implementations, the electronic component 310 and/or signal trace 320 is part of a sensor system that is configured to: detect a jaw movement of a user, detect a pulse of the user, detect electrical activity in the brain of the user, detect a body temperature of the user, detect a respiration indicator of the user, provide a guided meditation stimulation to the user or provide an electrode-based stimulation to the user. Various implementations of the electronic component 310 and/or signal trace 320 include a one or more of the following materials: aluminum, a conductive elastomer, graphene, graphene nanotubes, structured carbon black, carbon nanofibers, silver-coated elastic, metallic shavings, a metal-salt hybrid, conductive ink, a polymeric composite, an intrinsically conductive polymer (ICP), or a conductive fabric.

As with eartip 100A in FIG. 3, and eartip 100B in FIG. 4, eartip 100C shown and described with reference to FIG. 5 can also include one or more functionally graded walls. In a particular example, the outer wall 112 is functionally graded from the first end 108 to the second end 110 to comply with the entrance of the user's ear canal. For example, similar to certain implementations of eartip 100A and eartip 100B, the outer wall 112 in eartip 110C can include at least two distinct material types that are disposed in layers (not shown).

In particular implementations, the earpiece 100 can include a controller 350 (within body 102) that is coupled with the electronic component 310 and/or signal trace 320. In certain of these implementations, the electronic component 310 and/or signal trace 320 includes a PVDF film that is configured to detect movement in the skin of the user. In particular, the PVDF film is configured to detect a voltage change when the PVDF film is deformed, e.g., by movement in the skin of the user. In some cases, PVDF film is configured to detect vibrations caused by jaw or facial movement. For example, the PVDF film enables the controller 350 to detect a change in the voltage at one or more portions of the user's skin contacting the earpiece 100, e.g., in or proximate to the ear canal entrance that contacts the outer wall 112. In certain implementations, the controller 350 is configured to initiate one or more control functions based on the detected voltage change in the skin of the user. For example, the controller 350 can be configured to provide a prompt (e.g., audio and/or haptic prompt) to the user to take an action in response to detecting a change in the voltage at the user's skin. In a particular example, the controller 350 initiates a prompt to the user based on a detected voltage change that is associated with an increase in heart rate and/or stress level, e.g., providing a prompt to initiate a guided meditation, playback of relaxing music, or simply a prompt notifying the user of the detected change. In additional cases, the controller 350 is configured to initiate the guided meditation, playback of relaxing music, etc. without a prompt, e.g., where the user has predefined settings for the audio device that enable such an action in response to the detected voltage change. In still further implementations, the controller 350 is configured to initiate, or prompt to initiate, an exercise coaching audio track or stream in response to detecting a voltage change associated with exercise or sustained increase in heart rate or respiration.

In still further implementations, as shown in the example depiction of eartip 100C in FIG. 5, the audio device can further include an electronics module (EM) 360 coupled with the eartip 100C, e.g., in communication with an electronic component 310 integrated in the eartip 100C. In a particular implementation, the electronics module 360 is coupled to an electronic component 310 that is integrated in the outer wall 112 or the inner wall 107 of the body 102. In some cases, the electronics module 360 is part of the controller 350, however, in other implementations, the electronics module 360 is separate from the controller 350 in the body 102 (e.g., external to the body 102 as illustrated in phantom, or in a distinct portion of the body 102, not shown). In certain cases, the electronic component 310 is configured to perform functions of a conventional electronics module such as the electronics module 360 (e.g., processing functions, sensor detection functions, switching, etc.), such that the electronics module 360 is reduced in size relative to a reference electronics module in a reference in-ear wearable audio device that does not include the electronic component 310 integrated in the wall(s) 107, 112. That is, the presence of the electronic component 310 enables a smaller electronics module 360 than would otherwise be possible in conventional wearable audio devices. The ability to integrate the electronic component 310 in the walls 107 and/or 112 of the eartip 100C allows for the reduction in size of the electronics module 360, which in turn allows for a reduction in the size of the wearable audio device relative to conventional devices.

In various implementations, the eartip(s) shown and described herein can be formed by additive manufacturing. That is, the functional grading shown with respect to certain implementations of eartip can be made possible by additive manufacturing of that component. Additionally, embedding one or more electronic components or signal traces in the wall(s) of the body or in the support structure can be made possible by additive manufacturing of the component. Relative to conventional in-ear audio devices, the audio devices shown and described according to various implementations can improve device functionality without increasing device size. Additionally, the audio devices according to various implementations can provide an enhanced fit relative to conventional in-ear audio devices, thereby enhancing the user's comfort level and the overall user experience.

In various implementations, components described as being "coupled" to one another can be joined along one or more interfaces. In some implementations, these interfaces can include junctions between distinct components, and in other cases, these interfaces can include a solidly and/or integrally formed interconnection. That is, in some cases, components that are "coupled" to one another can be simultaneously formed to define a single continuous member. However, in other implementations, these coupled components can be formed as separate members and be subsequently joined through known processes (e.g., soldering, fastening, ultrasonic welding, bonding). In various implementations, electronic components described as being "coupled" can be linked via conventional hard-wired and/or wireless means such that these electronic components can communicate data with one another. Additionally, sub-components within a given component can be considered to be linked via conventional pathways, which may not necessarily be illustrated.

A number of implementations have been described. Nevertheless, it will be understood that additional modifications may be made without departing from the scope of the inventive concepts described herein, and, accordingly, other embodiments are within the scope of the following claims.

We claim:

1. An in-ear wearable audio device, comprising:

an eartip comprising:

a body having first and second ends, an inner wall extending between the first and second ends defining a hollow passage to conduct acoustic energy, and a deformable outer wall connected to the inner wall of the body at the first end and tapering away from the inner wall toward the second end, wherein the deformable outer wall is functionally graded from the first end to the second end to comply with an entrance of an ear canal of a user.

2. The in-ear wearable audio device of claim 1, wherein the functionally graded deformable outer wall comprises at least two distinct material types disposed in layers.

3. The in-ear wearable audio device of claim 2, wherein the distinct material types comprise at least two of: silicone, polyurethane, polynorbornene, thermoplastic elastomer (TPE), polyvinylidene fluoride (PVDF) or fluoroelastomer.

4. The in-ear wearable audio device of claim 2, wherein at least two of the distinct material types have distinct durometers, causing a section proximate the first end to be softer than a section proximate the second end.

5. The in-ear wearable audio device of claim 2, wherein at least one of the layers has a distinct thickness than another one of the layers.

6. The in-ear wearable audio device of claim 2, wherein each of the layers of the distinct material types has a thickness equal to or less than approximately 0.5 millimeters (mm).

7. The in-ear wearable audio device of claim 1, wherein the inner wall comprises at least two distinct material types.

8. The in-ear wearable audio device of claim 1, wherein the eartip is formed by additive manufacturing.

9. The in-ear wearable audio device of claim 1, further comprising:

an electronics module coupled with the eartip, wherein the deformable outer wall forms a generally frustoconical shape around the inner wall.

10. The in-ear wearable audio device of claim 1, further comprising an electronic component integrated in the deformable outer wall of the body or the inner wall of the body.

11. The in-ear wearable audio device of claim 1, further comprising a retaining structure coupled with the body.

12. The in-ear wearable audio device of claim 11, further comprising at least one of an electronic component or an electronic component signal trace integrated in the retaining structure.

13. The in-ear wearable audio device of claim 1, further comprising at least one of an electronic component or an electronic component signal trace integrated in the deformable outer wall of the body.

14. The in-ear wearable audio device of claim 1, further comprising at least one of an electronic component or an electronic component signal trace integrated in the inner wall of the body.

15. The in-ear wearable audio device of claim 1, wherein the inner wall of the body is functionally graded to have a greater stiffness proximate the first end of the body.

16. An in-ear wearable audio device, comprising:

an eartip comprising:

a body having first and second ends, an inner wall extending between the first and second ends defining a hollow passage to conduct acoustic energy, and a deformable outer wall connected to the inner wall of the body at the first end and tapering away from the inner wall toward the second end, wherein the deformable outer wall is functionally graded from the first end to the second end to comply with an entrance of an ear canal of a user, and a retaining structure coupled with the body, wherein the inner wall of the body is functionally graded to have a greater stiffness proximate the first end of the body.

17. The in-ear wearable audio device of claim 16, wherein the inner wall comprises at least two distinct material types.

18. The in-ear wearable audio device of claim 16, wherein the distinct material types comprise at least two of: silicone, polyurethane, polynorbornene, thermoplastic elastomer (TPE), polyvinylidene fluoride (PVDF) or fluoroelastomer.

* * * * *